Patented May 13, 1947

2,420,584

UNITED STATES PATENT OFFICE 2,420,584

PROCESS FOR PREPARING
n-BUTYRALDIMINE

Marshall R. Brimer, James E. Magoffin, and Harold Von Bramer, Kingsport, Tenn., assignors to Eastman Kodak Company, Rochester, N. Y., a corporation of New Jersey No Drawing. Application June 9, 1945,
Serial No. 598,645

4 Claims. (Cl. 260—566)

1

This invention relates to a process for preparing n-butyraldimine.

It is known that acetaldehyde reacts with ammonia to produce acetaldehyde-ammonia. This addition compound can be formed by slowly introducing acetaldehyde into liquefied anhydrous ammonia, or by introducing dry ammonia into an ethereal solution of acetaldehyde or by gradual addition of a concentrated aqueous solution of ammonia to acetaldehyde at low temperatures. If acetaldehyde-ammonia is desiccated over sulfuric acid, it loses water, becoming transformed into polymeric ethylideneimine (or acetaldimine).

We have now found that n-butyraldimine can be produced in good yields directly from n-butyraldehyde and ammonia, if the n-butyraldehyde is reacted with the ammonia in the presence of sufficient water.

It is, accordingly, an object of our invention to provide an improved process for preparing n-butyraldimine. Other objects will become apparent hereinafter.

In accordance with our invention, we prepare n-butyraldimine by reacting one molecular proportion of n-butyraldehyde with at least one molecular proportion of ammonia, in the presence of from about 2 to about 4 molecular proportions of water for each molecular proportion of ammonia. Ordinarily there is little advantage in employing more than 2 molecular proportions of ammonia for each mole of n-butyraldehyde. The reaction proceeds rapidly at ordinary temperatures and is exothermic. It is advantageous to cool the reaction mixture to hold the temperature of the reaction mixture at from about 15° to about 30° C. It is advantageous to add the n-butyraldehyde gradually to a water solution of ammonia. The water solution is preferably vigorously agitated during the addition of the n-butyraldehyde. When the reaction is complete (within a few minutes from the time the last of the n-butyraldehyde is added gradually to a vigorously agitated water solution of ammonia), the reaction mixture separates into two layers upon stopping the agitation. The upper layer consists of n-butyraldimine and n-butyraldehyde (usually 75 to 80 per cent by weight of the layer is n-butyraldimine), and the lower layer is largely water. The two layers are easily separable and the lower aqueous layer can be drawn off from the reaction vessel.

The upper layer consisting essentially of n-butyraldimine and a minor proportion of n-butyraldehyde, is useful for a number of purposes without further treatment; for example, it can

2 be treated with hydrogen, in the presence of a metal hydrogenation catalyst, to produce n-butylamine, if ammonia in excess of the n-butyraldehyde is added. See our copending application Serial No. 598,644, filed of even date herewith. To remove the n-butyraldehyde from the upper layer, the layer can be subjected to distillation under reduced pressure until the n-butyraldehyde is removed.

Our process can be operated as a continuous or as a batch process. When operating in a continuous manner, the n-butyraldehyde and water solution of ammonia (e. g. 28 per cent by weight) are introduced simultaneously into one end of a cylindrical reaction vessel. The reaction mixture is passed through a zone of vigorous agitation (where the reaction is rapidly completed) into a zone of comparative quiescence, where separation of the layers takes place. By means of appropriately spaced exit ports, the n-butyraldimine layer and the water layer can be continuously withdrawn from the system. The continuous process has the advantage over the batch process of producing n-butyraldimine of uniform quality in easily regulated quantities.

The following example will serve to illustrate further the manner of practicing our invention.

*Example*

2190 g. (29.2 mol.) of 96 per cent n-butyraldehyde were added gradually to 1776 g. of vigorously agitated 28 per cent (by weight) aqueous ammonia (29.2 mol. of ammonia and 70.9 mol. of water) over a period of two hours. The reaction mixture was cooled to hold the temperature at about 25° C. during the addition of the n-butyraldehyde and the vigorous agitation was continued for about ¼ hour after the addition of the n-butyraldehyde. The agitation was then stopped and the reaction mixture allowed to settle. The lower aqueous layer was drawn off, leaving the upper layer (2139.1 g.) which contained n-butyraldimine and n-butyraldehyde, the n-butyraldimine constituting from 75 to 80 per cent by weight of the layer. The mixture of n-butyraldimine and n-butyraldehyde can be employed as such or subjected to distillation under reduced pressure to remove the n-butyraldehyde.

In the foregoing example, the ratio of moles of ammonia to mole of water is about 1:2.4. In a similar manner n-butyraldimine can be prepared using ratios of moles of ammonia to moles of water of 1:2, 1:3 or 1:4 for example.

What we claim as our invention and desire to be secured by Letters Patent of the United States is:

1. A process for preparing n-butyraldimine comprising reacting one molecular proportion of n-butyraldehyde with at least one molecular proportion of ammonia, in the presence of from about 2 to about 4 molecular proportions of water for each mole of ammonia.

2. A process for preparing n-butyraldimine comprising reacting one molecular proportion of n-butyraldehyde with at least one molecular proportion of ammonia, in the presence of from about 2 to about 4 molecular proportions of water for each mole of ammonia, at a temperature of from about 15° to about 30° C.

3. A process for preparing n-butyraldimine comprising adding n-butyraldehyde to a vigorously agitated water solution of ammonia, the water solution containing at least one molecular proportion of ammonia for each molecular proportion of n-butyraldehyde and containing from about 2 to about 4 molecular proportions of water for each molecular proportion of ammonia.

4. A process for preparing n-butyraldimine comprising adding n-butyraldehyde to a vigorously agitated water solution of ammonia, the water solution containing at least one molecular proportion of ammonia for each molecular proportion of n-butyraldehyde and containing from about 2 to about 4 molecular proportions of water for each molecular proportion of ammonia, while maintaining the reaction mixture at a temperature of from about 15° to about 30° C.

MARSHALL R. BRIMER.
JAMES E. MAGOFFIN.
HAROLD VON BRAMER.

REFERENCES CITED

The following references are of record in the file of this patent:

UNITED STATES PATENTS

| Number | Name | Date |
|---|---|---|
| 2,045,574 | Adkins | June 30, 1936 |
| 2,097,630 | Lutz | Nov. 2, 1937 |
| 2,219,879 | Vanderbilt | Oct. 29, 1940 |
| 2,319,848 | Clark et al. | May 25, 1943 |

FOREIGN PATENTS

| Number | Country | Date |
|---|---|---|
| 290,803 | Germany | Mar. 15, 1916 |